Inventor
CHARLES HARRISON,
By Fetherstonhaugh & Tansley
Attorneys

Patented May 7, 1935

2,000,481

UNITED STATES PATENT OFFICE 2,000,481

HOSE COUPLING

Charles Harrison, Vancouver, British Columbia, Canada

Application June 27, 1933, Serial No. 677,940. Renewed March 15, 1935. In Canada November 23, 1932

1 Claim. (Cl. 285—86)

My invention relates to improvements in hose connections and couplings and is a continuation in part of my application Serial No. 643,992, filed November 23, 1932. The objects of the invention are to provide means whereby the rotational movement in affixing the connection to the end of the hose is solely between metal parts, thus reducing the friction engendered when a metallic member is rotated in contact with the rubber of the hose; to provide a connection which will not "freeze" to the rubber after sustained use or pressure, whereby the connection may be readily removed from a worn out hose and used again; to provide for the end of the hose to serve as a non-removable washer for the connection, and to provide a connection which is light in weight and of such cheap construction as to make it universally desirable.

The invention consists essentially of a tapered thimble to be placed within the hose, an annular split ring to encompass the hose intermediate the length of the thimble and a threaded collar for drawing the ring along the hose upwards of the thimble and for coupling the hose to a nipple or other male connection, as will be more fully described in the following specification and shown in the accompanying drawing, in which:—

In the drawing like characters of reference indicate corresponding parts in each figure.

Figure 1:
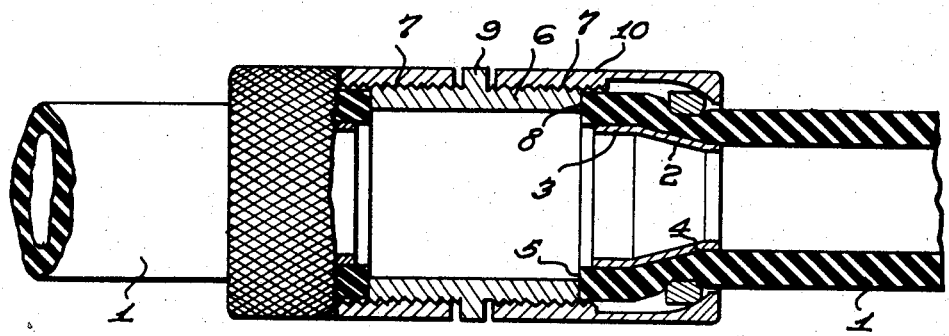
Fig. 1 is a longitudinal section of the invention as used for coupling two lengths of hose together.

The numeral 1 represents a pair of lengths of rubber or other suitable hose which it is desired to connect together.

Fitted in adjacent ends of the lengths of hose 1 are annular nipples 2 which are parallel adjacent their opposed ends as at 3 and tapered at their opposite ends as at 4. These nipples are thrust into the lengths of hose 1 somewhat beyond their length to expose an end portion 5 of each hose which is adapted to serve as a washer.

The numeral 6 indicates a nipple of any desired type, preferably having two threaded male portions 7 which are faced off at their ends as at 8 to abut the hose ends 5 and having intermediate its length a hexagon or knurled external flange 9.

The knurled collar 10 has the inner surface thereof adjacent one end threaded as at 11, and the opposite end provided with a cam shaped enlargement 12 forming an internal flange. Between said threaded portion and enlargement the collar 10 is reduced in thickness forming a recess 13, the purpose of which will hereinafter appear. An annular split ring 14 is inserted in the recess 13 in a manner hereinafter to be pointed out.

Figure 3:
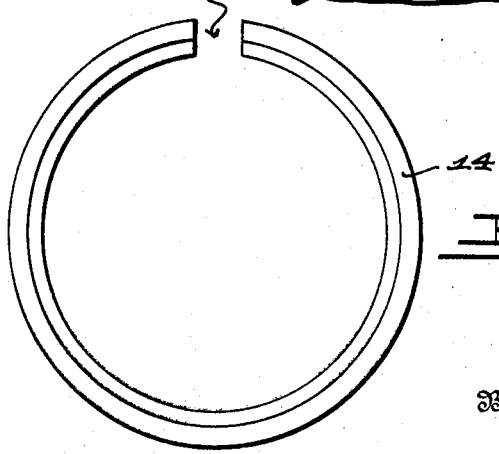
Fig. 3 is a plan view of the split ring.

The ring member is not merely split but has a portion of the ring removed as indicated at 15 in Figure 3. This ring member having a limited degree of resiliency when it is desired to insert the ring within the collar 10, the spaced ends of the ring are pressed together or in close proximity to each other, thereby changing the configuration of the ring to an oval permitting same to be inserted in the recess 13 in the collar 10 from either end thereof after which, due to the resiliency of the ring, it would assume its normal shape and become a fixture within and not removable from the collar 10.

The parallel portion 4 of the nipple 2 extends beyond the split ring 14 and is of such diameter as to fit snugly into the hose and afford a slight grip upon its interior surface so that the sliding of the split ring towards the cone 2 will not force the cone out from the end of the hose. The parallel portion 3 of the nipple serves to prevent the thrust of the face 8 of the connecting nipple 6 when abutting the washer face 5 of the hose 1 from exerting such internal thrust thru the medium of the rubber hose as to force the nipple outwards from the ends of the hose. After sustained compression of the end of the hose between its washer face 5 and the split ring 14, a distortion of the rubber in the form of an external enlargement 16 becomes permanent. This enlargement extends outwards into the recess 13 thus preventing said collar from slipping lengthwise of the hose when the hose coupling is disconnected.

Obviously, when there is a withdrawal pressure exerted on the hose, the split ring member 14 riding on the enlargement 12 will bite into the rubber and form a more or less permanent anchorage. This is clearly shown in Fig. 2. The inner and lower edge of the ring may be beveled or pointed to facilitate its engagement with the hose. The lower outer edge of the split ring should be rounded so that the engagement of the ring with the cam face 12 will cause the ring to become compressed and engage the hose member as desired.

It will be noted that the rotational friction in connecting the coupling or attaching it to the hose is solely between metal and metal, or between the flange 12 of the collar 10 and the split ring 14, and that no friction whatever is set up between metal and rubber.

Figure 2:
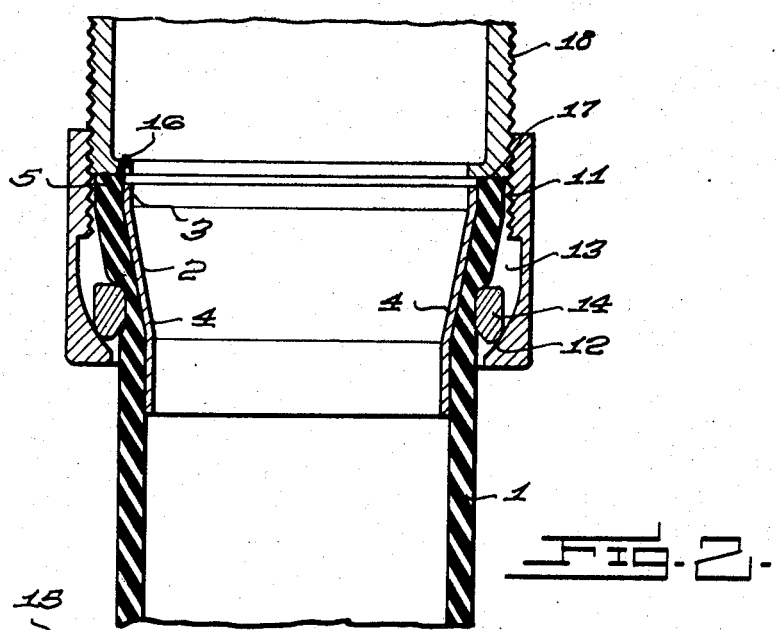
Fig. 2 is a transverse sectional view of the invention as applied to the suction connection of a pump.

In the modification shown in Figure 2, where suction rather than pressure is to be encountered, I leave the end 5 of the hose projecting slightly beyond the end of the nipple as at 17 and provide a face to the male end of the connection 18 of a width greater than the thickness of the wall of the hose as at 16, so as to ensure the retention of the nipple in position within the hose.

In the larger sizes of connections, I may prefer to make the annular split ring 14 in two halves.

By providing the annular recess 13 between the flange 12 and the internal thread 11 of the collar 10, the same coupling fittings can be used for hose of varying wall thicknesses without increasing the internal diameter of the thread of the collar 10. Where a standard rubber hose is used in a given coupling, the expanded external periphery of the hose will extend to the internal threads, but will not extend, when assembling, into the recess 13, but if a hose of a greater hose thickness will be in part accommodated within said recess. It will also be apparent that as the hose is gripped only adjacent the end 4 of the nipple 2 the free end of the hose or all that portion of the hose between the ring 12 and its face 5 constitutes a washer, its length being such as to provide exceptional resiliency and to produce a tight joint even though the contacting face of the complementary member is rough or otherwise damaged.

What I claim is:

A hose coupling adapted for connection to a complementary member having a threaded and contacting face, said face comprising a straight tapered nipple having at its smaller end an integral cylindrical extension, said nipple being adapted for insertion into the free end of a hose and to afford a frictional grip between the cylindrical extension and the inner face of the hose, a collar internally threaded adjacent one end, a complementary member in threaded engagement with the threaded portion of said collar, a cam face formed internally of the collar adjacent the other end, the interior surface of the collar between the threaded surface and cam being reduced to form a groove, a split ring inserted in said groove and unremovable therefrom, and a hose member retained in said collar through the medium of the nipple split ring and cam face.

CHARLES HARRISON.